April 12, 1949.                R. D. SNYDER                2,467,239
BELLOWS SHAFT SEAL PROTECTOR
Filed July 30, 1945

INVENTOR.
Russell D. Snyder
BY Charles P. Vajtech
   Atty.

Patented Apr. 12, 1949

2,467,239

UNITED STATES PATENT OFFICE 2,467,239

BELLOWS SHAFT SEAL PROTECTOR

Russel D. Snyder, Chicago, Ill., assignor to Crane Packing Company, Chicago, Ill., a corporation of Illinois Application July 30, 1945, Serial No. 607,821

3 Claims. (Cl. 286—11)

This invention relates to sealing devices and particularly to that class of sealing devices which utilizes a pair of relatively rotatable radially disposed surfaces for effecting a fluid-tight connection between the relatively rotatable parts.

The principal object of this invention is to provide an improvement upon the seal disclosed in my prior Patent No. 2,360,372, which improvement will adapt the aforesaid sealing device for a greater variety of uses. More specifically, the principal object of this invention is to provide a means for protecting the resilient bellows sealing element of the device from damage due to the application of high pressure internally of the bellows such that a fold thereof would be forced into the pin and slot driving connection for one of the sealing elements.

A more specific object of this invention is to provide a ferrule between the apex of the fold of a bellows seal and a lug-and-slot connection adjacent the fold such that the ferrule will protect the apex from entering the lug-and-slot connection.

Figure 1:
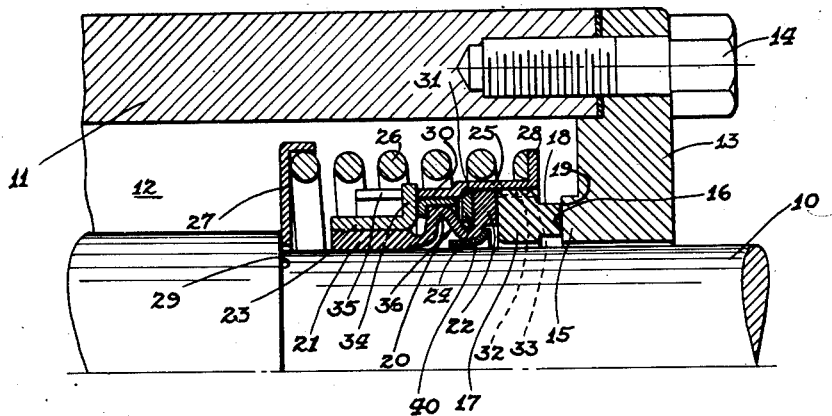
Figure 2:
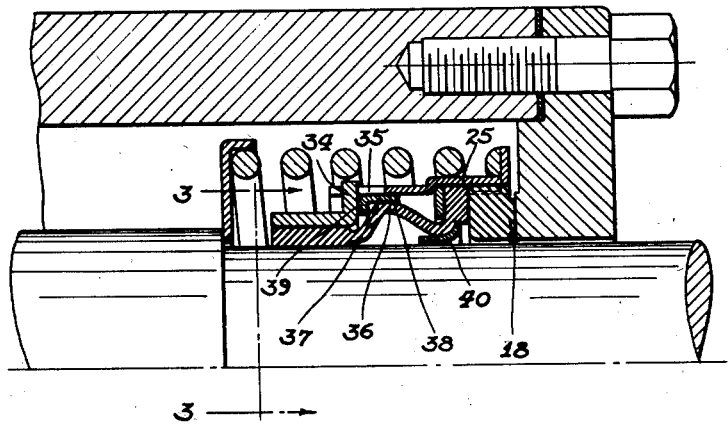
Figure 3:
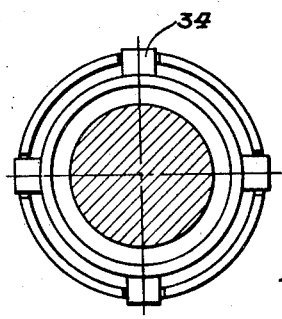

These and other objects and features of this invention will become apparent from the following description when taken together with the accompanying drawings, in which Fig. 1 is a fragmentary side elevation in section of a seal incorporating the protective device of this invention;

Fig. 2 is the same view showing the seal extended so that the slot is exposed and with the protective ferrule shown over the exposed slots; and Fig. 3 is an end view of the lug-and-slot connection taken along line 3—3 of Fig. 2.

Referring in detail now to the drawings and particularly to Fig. 1, there is shown a rotatable element 10 which may be the shaft of a compressor or other fluid working device, and a housing 11 spaced from shaft 10 so as to form a chamber 12 therebetween, said chamber being normally at a much lower pressure than the exterior of the housing. Chamber 12 is defined in part by a closure member 13 which is secured by means of bolts 14 or other fasteners to housing 11, the exterior of chamber 12 so formed being in communication with fluid under pressure. Thus chamber 12 may be at sub-atmospheric pressure and the exterior at atmospheric pressure, or housing 12 may be immersed in a fluid having a considerable static or pressure head. On the inside of closure member 13 there is formed a laterally extending ring 15 having a surface 16 disposed normally to the axis of rotation of shaft 10 and which constitutes one of the sealing surfaces of the device. Adjacent ring 15 is a sealing washer 17 having a similar ring 18 on which is formed a sealing surface 19, said surface 19 being maintained in engagement with sealing surface 16 so as to form a fluid-tight seal therebetween.

A seal is formed between washer 17 and shaft 10 by means of a flexible deformable sleeve 20 preferably made of rubber, either natural or synthetic, or a combination of the two, and formed with spaced flanges 21 and 22 connected by a fold 36, flange 21 being preloaded upon shaft 10 by means of a rigid band 23, and flange 22 being held against the left-hand surface (Fig. 1) or back of washer 17. The holding means for flange 22 comprises, a washer 24 made of rigid material such as brass, steel or the like, a shell 25 surrounding flange 22, and washers 17 and 24; and a spring 26 which is compressed between a spring retainer 27 and a flange 28 formed on the end of sleeve 25. Spring retainer 27 abuts a shoulder 29 or other raised surface formed on shaft 10 and hence is held against axial movement to the left under the action of spring 26. Shell 25 has a portion of reduced diameter 30 which forms a shoulder 31 by means of which this spring pressure is transmitted directly to washer 24.

One or more small depressions 32 are formed in the outer periphery of shell 25, said depressions fitting into corresponding slots 33 formed in washer 17 to provide a driving connection between the sleeve and washer. Band 23 is formed with radially extending lugs 34 which fit into slots 35 formed in the end of reduced section 30 of shell 25. Lugs 34 (Fig. 3) are relatively wide circumferentially so that the slots 35 are likewise correspondingly wide. Thus, when shell 25 is moved to the right in Fig. 1 under the action of spring 26, a considerable opening, or rather series of openings, is presented to the sealing sleeve 20. The fold 36 of sleeve 20 is so shaped that the apex of the fold is found in the vicinity of the slot 35.

Referring now to Fig. 2, it will be seen that fold 36 when subject to internal pressure would be forced into the slots 35 and if sufficient pressure is provided and likewise a sufficient axial movement of shell 25 occurs, the fold will be forced into the slot and may eventually rupture, thereby destroying the seal.

To alleviate this situation, in accordance with the present invention, a ferrule 37 is inserted between the apex of fold 36 and the inside of shell 25. This ferrule is formed with a cylindrical section 38 which is of sufficient axial extent to completely cover slots 35 when the seal is in its most extended position, and with a short radially inwardly extending section 39 which bears against the lugs on one side and against the fold 36 on the other, so that said ferrule 37 is constrained to remain in substantially the position in which it is shown in Figs. 1 and 2. This is particularly true when the inside of the bellows is subjected to pressure and thereby presents a considerable resistance to such deformation as would be necessary to cause inwardly extending flange 39 to pass over the apex 36 of the fold.

Ferrule 37 is preferably made of rigid material such as metal and is freely slidable on the inside of reduced portion 30 of shell 35. Attention is directed to the fact that the inside diameter of flange 39 of ferrule 37 is at least as great as the external diameter of band 23. It is also pointed out that lugs 34 extend radially outwardly from the outer surface of band 23 so that the contact between flange 39 and the right-hand edge (Figs. 1 and 2) of band 23, is a solid line contact and may be a continuous surface contact despite the fact that lugs 34 are discontinuous.

A ferrule 40 is provided between the forward part of sleeve 30 and shaft 10 to prevent this part of the sleeve from contacting the shaft and possibly "freezing" thereto.

It will be observed that the greatest internal diameter of fold 36 is greater than the internal diameter of ring 18 of washer 17 so that with fluid under pressure on the inside of fold 36 there will be a net effective area of pressure in the direction of sealing surface 16 on closure member 13, so as to assist in maintaining these surfaces in contact with one another. Similarly, it will be noted that the diameter of the bellows adjacent ring 22 is less than the outside diameter of ring 18 so that should pressure be applied to the outside of the seal, there will be a net effective pressure in the direction of sealing surface 16 tending to help maintain this surface and sealing surface 19 in fluid-tight contact. Thus the seal illustrated in Figs. 1 and 2 is adapted for use with either internal or external pressure and, when the pressure is applied internally, there is no danger of the bellows blowing out through the slots 35 since ferrule 37 completely conceals the slots at any working position of washer 17 relative to ring 21 which is preloaded on shaft 10. These extreme positions are illustrated in Figs. 1 and 2, Fig. 1 showing ring 18 as it would appear when first installed, and Fig. 2 showing ring 18 as it would appear after it had been almost completely worn.

It is understood that the foregoing description is merely illustrative of a preferred embodiment of this invention and that the scope of the invention therefore is not to be limited thereto but it is to be determined by the appended claims.

What is claimed is:

1. In a sealing unit for effecting a fluid seal between two relatively rotatable structures, a sealing washer, a shell concentric with the washer for driving the washer, a sealing element for effecting a seal between the washer and one of the structures, said element having a flexible fold within the shell, a band rotatable with the said one of the structures, said shell having slots in proximity to the fold, lugs on the band extending into the slots and being movable therein axially of the shell, and means interposed between the fold and shell and movable with the lugs relative to the shell to cover the slots, whereby to prevent the fold from entering the slots when subjected to pressure in the direction of the slots.

2. In a sealing unit for effecting a fluid seal between two relatively rotatable structures, a sealing washer, a shell concentric with the washer and having a driving connection therewith, a sealing element for effecting a seal between the washer and the said one of the structures, said element having a flexible fold within the shell, a band rotatable with the said one of the structures, said shell having slots in proximity to the fold, lugs on the band extending into the slots and being movable axially of the shell, and a ferrule interposed between the fold and shell and movable with the lugs relative to the shell to cover the slots, whereby to prevent the fold from entering the slots when subjected to pressure in the direction of the slots.

3. The combination described in claim 2, said ferrule comprising a cylindrical section surrounding the fold and a radially inwardly extending flange adjacent the lugs.

RUSSEL D. SNYDER.

REFERENCES CITED

The following references are of record in the file of this patent:

UNITED STATES PATENTS

| Number | Name | Date |
|--------|------|------|
| 2,027,505 | Winkler | Jan. 14, 1936 |
| 2,227,304 | Geyer | Dec. 31, 1940 |
| 2,360,372 | Snyder | Oct. 17, 1944 |
| 2,365,351 | Matter | Dec. 19, 1944 |